Aug. 27, 1968  A. JOTZOFF  3,398,909
KINEMATOGRAPHIC APPARATUS
Filed Aug. 9, 1965  2 Sheets-Sheet 1

INVENTOR
ANGELO JOTZOFF

BY Emory L. Groff

ATTORNEY

Aug. 27, 1968  A. JOTZOFF  3,398,909
KINEMATOGRAPHIC APPARATUS

Filed Aug. 9, 1965  2 Sheets-Sheet 2

INVENTOR
ANGELO JOTZOFF
BY Emory L. Groff
ATTORNEY

United States Patent Office 3,398,909
Patented Aug. 27, 1968

3,398,909
KINEMATOGRAPHIC APPARATUS
Angelo Jotzoff, Bubenreuth, Erlangen, Nurnberg, Germany, assignor to Paillard S.A., Vaud, Switzerland, a corporation of Switzerland
Filed Aug. 9, 1965, Ser. No. 478,163
Claims priority, application Switzerland, Oct. 13, 1964, 13,249/64
3 Claims. (Cl. 242—55.11)

ABSTRACT OF THE DISCLOSURE

A kinematographic apparatus wherein a feed spool and a take up spool are arranged side by side on a common axis and film is transferred from the feed spool at an acute angle past a film exposure gate to the take up spool. The planes of the moving film form two free, relatively short loops of substantially helicoidal shape and eliminate the necessity of auxiliary guiding and feeding means for the film.

---

The present invention has for its object a kinematographic apparatus, primarily a camera, of the type wherein the film supply and take up spools are located side by side and coaxially, the film being unwound and rewound in different parallel planes.

In known apparatus of this type, the winding planes for the supply spool and for the take up spool are parallel with the optical axis of the objective and also parallel with the direction of movement of the film in front of the exposure gate. The common axis of the supply and take up spools is at right angles with the optical axis without meeting the latter and the same is true for said common axis with reference to the vector illustrating the progression of the film in front of the exposure gate.

The object of the above-mentioned structures consists in reducing to a minimum the bulk and weight of the cameras and projectors. Heretofore, apparatus of this type required comparatively bulky loops of film so as to make up for the lateral shifting between the film spools and the channel registering with the exposure or projection gate. These film loops were carried by auxiliary guiding members and it was necessary to provide auxiliary feeding means so as to feed and suitably guide the film onto said members.

When the loop is designed so as to make the film from one spool pass directly into the exposure channel, said loop must extend over an arc of about 270°, which leads to the formation of wobbly nonstable film loops to the rear and/or to the front of the exposure gate. Such loops have an unfavorable action on the steadiness of the film pictures so that it may often be necessary to provide a locking claw for positioning the film inside its guiding channel. Furthermore, the loading of kinematographic cameras of such a type is a difficult matter and hitherto it has not been possible to produce an automatic loading of such cameras.

The present invention has for its object a kinematographic apparatus of the type referred to having supply and take up spools arranged side by side on a common axis and wherein the above-mentioned drawbacks are eliminated by reason of the transverse planes of symmetry of the spools forming an acute angle with the direction of movement of the film in front of the film gate. In other words, the common axis of the spools no longer crosses the vector defining the movement of the film in the gate at right angles therewith.

Through this arrangement, the transfer of the film out of one winding plane into the other may be performed without any auxiliary element, the film assuming the shape of free and short loops extending over an arc of less than 180° respectively ahead of and beyond the gate, whereby the usual transfer means compensating for the angular shifting of the winding planes are eliminated.

Thus, the path of the film may be as simple as the path of the film in apparatus wherein the supply and take up spools are located in a common vertical plane also containing the axis of the film guiding channel. Through the simplified arrangement according to the invention, it is possible to obtain an automatic loading of the apparatus through known and conventional means provided for such loading in apparatus wherein the spools lie in a common vertical plane.

The accompanying drawings illustrate diagrammatically and by way of example two preferred embodiments of the apparatus forming the object of the invention. In said drawings.

Figure 1:
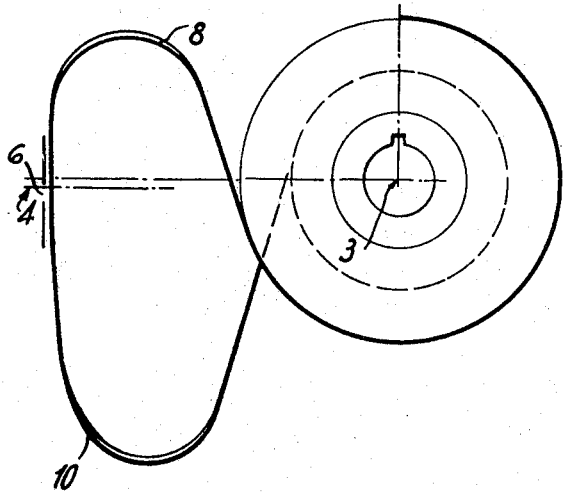
FIGS. 1 to 3 are respectively a side view, a front view and a plan view of a first embodiment.

In the drawings, the path followed by the film is illustrated alone and none of the auxiliary known elements of a kinematographic apparatus has been illustrated, so as not to crowd the drawings unnecessarily.

Figure 2:
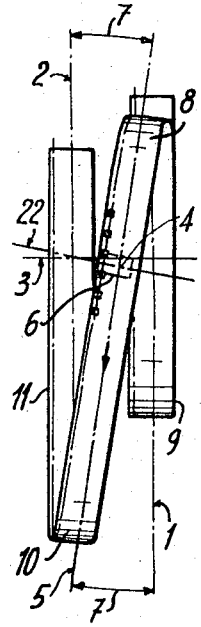
Figure 3:
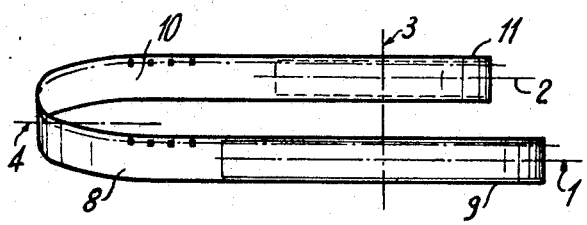

Referring to FIGS. 1 to 3, a supply spool the main transverse plane of which is designated by the reference 1 carries an unexposed film winding 9 wound around it and its winding axis 3 is the same as that of the take up spool which carries a winding 11 of the exposed film and which is designated by the reference 2 applied to its transverse plane. The planes 1 and 2 defining the directions of the windings 9 and 11 are parallel with the optical axis 4 of a view-taking objective which is not illustrated. The planes 1 and 2 corresponding to the windings 9 and 11 form acute angles 7 with the direction 5 of movement of the film in front of the film exposure gate 6.

The film as it passes off the supply spool towards the exposure gate 6 forms a loop 8 extending over an arc of almost 180°, which loop is slightly twisted as required by the presence of said acute angle 7. Similarly, the film which has passed in front of the exposure gate forms a further loop 10 extending also over an arc of almost 180°, and showing a slight torsion before it reaches the take up spool.

A line 22 perpendicular to the axis 5 defining the path of the film in registery with the film exposure gate 6, is normally horizontal in a camera, whereas the axis 3 common to the two spools forms an angle 7 with reference to said horizontal line.

The arrangement described is very simple and does not include any feed means for controlling the movement of the film ahead of the gate and beyond the latter. The embodiment which has just been described is of particular interest for small-sized amateur cameras, wherein the provision of film is comparatively small. It is a well-known fact that the elasticity of the film associated with a claw controlling its movement, with a frictional drive of the take up spool and with a slight braking of the film spool is sufficient for ensuring the stability of the upper film loop 8 and of the lower film loop 10.

In view-taking cameras of a larger size, it is necessary to provide feed means for the positive drive of the film ahead of and beyond the exposure gate.

Figure 4:
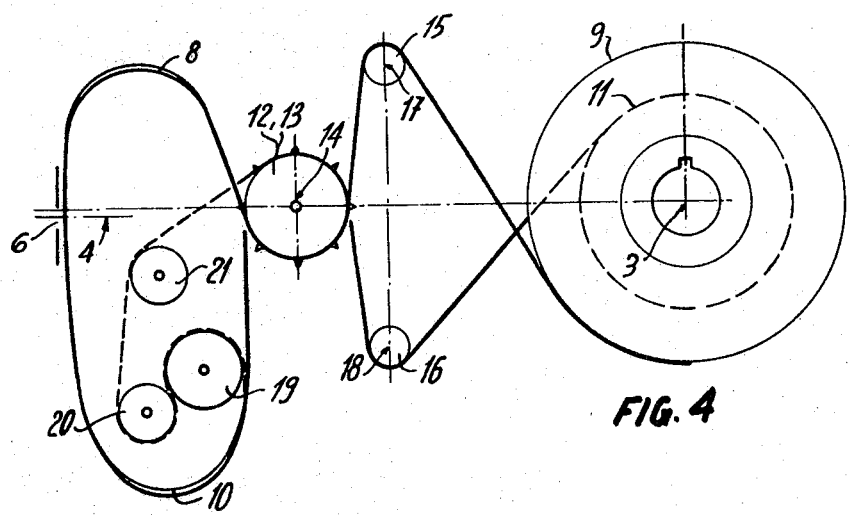
FIGS. 4 to 6 are similarly a side view, a front view and a plan view of the second embodiment.
Figure 6:
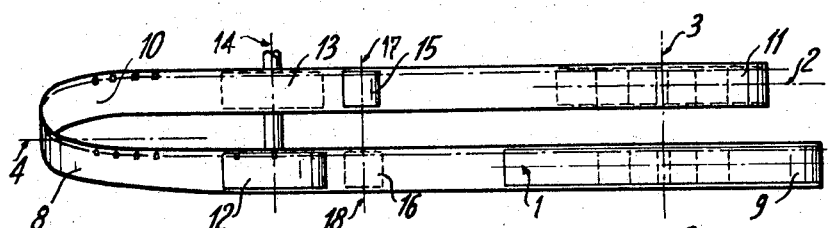
Figure 5:
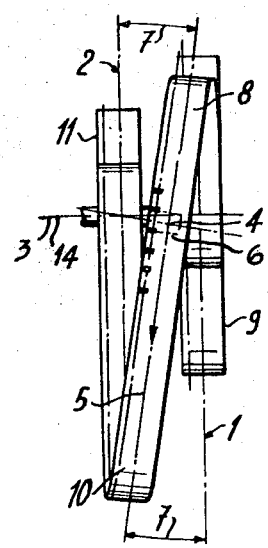

FIGS. 4 to 6 relate to an embodiment provided with such driving means. The angular location of the planes in which the film is wound at 9 and 11 is defined as precedingly by an acute angle 7 with the direction 5 of the movement of the film in its guiding channel.

The difference with reference to the first embodiment consists in that the film is driven by two feed means 12 and 13 before and after its passage in registry with the exposure gate; said two feed means 12 and 13 arranged side by side are coaxially carried by a spindle 14 parallel with the axis 3 of the windings at 9 and 11. If required, guiding rollers 15 and 16, may be provided in channels, not illustrated, which are intended for the guiding of the film, primarily when the film windings are housed in a magazine, so as to ensure a better light-tightness. The axes 17 and 18 of said guiding rollers are also parallel with the axis 3.

As in the case of the first embodiment, the film loops 8 and 10 ensure the passage of the film between the terminal windings and the channel registering with the exposure gate.

The arrangement described is also applicable in the case of films provided with a sound track and, as illustrated in FIG. 4, the elements required for scoring the film may be located inside the loop 10. Said elements comprise, for example, a drum 19 and guiding rollers 20 and 21 the axes of which are parallel with the axes 3 and 14. Thus, the path of the film illustrated in interrupted lines which may serve in the case of a sound film extends in a plane 2 sloping with reference to the channel guiding the film in front of the exposure gate. The elements provided for guiding sound films are thus substantially enclosed within the loop 10 of a silent film.

I claim:

1. In a kinematographic apparatus including a film exposure gate registering with its optical axis, a supply spool and a take up spool located coaxially and side-by-side, the planes of the wound film carried by said spools being substantially parallel to each other and to the optical axis, characterized in that the direction of the film in front of the film exposure gate forms an acute angle with the planes of the said wound film, the film forming two free loops during its passage from the supply spool to the film exposure gate and from the film exposure gate to the take up spool, said loops being of substantially helicoidal form.

2. Apparatus according to claim 1, characterized in that it comprises a pair of coaxial feed means, the axis of said feed means being parallel to the axis of the said supply spool and take up spool, said pair of feed means disposed between said loops and said wound film.

3. Apparatus according to claim 2, characterized in that it comprises means to guide the film in front of a sound-reproducing apparatus, said means arranged in the same plane as the plane of the winding of the take up spool and inside of the loop formed by a silient film not making use of the path of the sound film.

References Cited

UNITED STATES PATENTS

| 1,303,542 | 5/1919 | De Vry | 242—55.11 X |
| 2,568,539 | 9/1951 | Briskin et al. | 242—55.11 X |
| 2,937,816 | 5/1960 | Wood | 242—55.12 |

LEONARD D. CHRISTIAN, *Primary Examiner.*